United States Patent [19]
Narukawa

[11] Patent Number: 5,583,621
[45] Date of Patent: Dec. 10, 1996

[54] PRINTER PROVIDED WITH TONER CONSUMPTION SAVING MODE

[75] Inventor: Toshiki Narukawa, Kasugai, Japan

[73] Assignee: Brother Kogyo Kabushiki Kaisha, Nagoya, Japan

[21] Appl. No.: 509,608

[22] Filed: Jul. 31, 1995

[30] Foreign Application Priority Data

Aug. 11, 1994 [JP] Japan .................................. 6-211869

[51] Int. Cl.$^6$ .................. G03G 15/043; G03G 15/06; H04N 1/21
[52] U.S. Cl. ........................................ 355/246; 347/131
[58] Field of Search ..................... 347/131; 355/232, 355/233, 214, 228, 245, 246

[56] References Cited

U.S. PATENT DOCUMENTS 5,144,337  9/1992  Imamura et al. .

FOREIGN PATENT DOCUMENTS

| 0446891A2 | 9/1991 | European Pat. Off. . |
| 0587187A1 | 3/1994 | European Pat. Off. . |
| 1-133075 | 5/1989 | Japan . |
| 2144574 | 4/1990 | Japan . |
| 6-14167 | 1/1994 | Japan . |

OTHER PUBLICATIONS

*Patent Abstracts of Japan*, vol. 18, No. 115 (M1566) Feb. 24, 1994 for JP-A-05309871, Nov. 22, 1993.
*WPIDS*, Acc. No. 96-054916 for JP-A-07314783, May 12, 1995.
*Patent Abstracts of Japan* (CD-ROM), vol. 95, No. 10, for JP-A-07266615, Oct. 17, 1995.
*Patents Abstracts of Japan* (CD-ROM), vol. 95, No. 4, for JP-A-07107280, Apr. 21, 1995.
*Patent Abstracts of Japan* (CD-ROM), vol. 95, No. 1, for JP-A-07009695, Jan. 13, 1995.

*Primary Examiner*—R. L. Moses
*Attorney, Agent, or Firm*—Oliff & Berridge

[57] ABSTRACT

An electrophotographic printer capable of maintaining printing quality and economizing toner without formation of white-out portion when toner consumption economizing mode is selected. Ordinary toner consumption mode and toner economizing mode are selectively used. If the toner economizing mode is selected, a shift resistor delays dot pulses from a pulse generating circuit and outputs the delayed shift pulses. An AND gate circuit produces a logical product of the dot pulses and the shift pulses. Thus, ON period of the output pulse can be shortened, thus economizing the toner consumption. Several toner economizing modes are provided so as to control length of ON period of the output pulses.

7 Claims, 5 Drawing Sheets

LASER DIODE: OFF  ON  OFF  ON  OFF  ON

PRINTER PROVIDED WITH TONER CONSUMPTION SAVING MODE

BACKGROUND OF THE INVENTION

The present invention relates to an electrophotographic type printer using toners, and more particularly, to such printer capable of economizing toner consumption amount.

In a conventional electrophotographic type printer such as a laser printer, laser beam is irradiated for exposure to provide a latent image on a photosensitive drum, and toner are electrostatically attracted onto the drum. In this case, consumption amount of toner for use in development will greatly influence to the running cost of the printer. In this connection, as described in a Japanese Patent Application Kokai No. Hei 2-144574, there has been provided a printer provided with a toner consumption economizing mode for reducing running cost so as to cut down the toner consumption by thinning out dots to be printed in accordance with a predetermined rule, if the toner consumption economizing mode is selected.

However, in the printing device of the JP'574 4 publication, printing to a sheet is performed after the thinning-out process of the dot data if the toner economizing mode is selected. As a result, a fine character or line to be printed on the sheet may not be printed onto the sheet to degrade the printing quality.

A Japanese Patent Application Kokai No. Hei 1-133075 discloses a laser printer having two laser diode drive sources for ordinary toner consumption mode and for toner economizing mode. If the toner economizing mode is selected, the laser diode drive source is switched to reduce the laser diode driving current so as to reduce luminous intensity of the laser diode, to thereby reduce a developing area or width per one dot of the laser beam, to thus restrain the toner consumption amount.

In the laser printer of the JP'075 publication, laser diode driving current is controlled in an analog manner by switching the laser diode drive sources from one to another, and therefore, a great numbers of the laser diode driving sources are required if multi-stage control is intended. As a result, production cost may be increased and fine control may become difficult.

SUMMARY OF THE INVENTION

It is therefore, an object of the present invention to overcome the above-described conventional drawbacks, and to provide an improved printer capable of performing multi-stage fine control to the toner consumption and capable of economizing the toner consumption amount while maintaining a printing quality at a certain level, to thus restrain running cost.

This and other object of the present invention will be attained by modulating dot pulse generated in accordance with dot data for printing and by performing printing with the modulated dot pulse. To be more specific, the present invention provides an electrophotographic type printer using toner for printing a toner image onto a sheet including a main frame, a mode selection switch, an image buffer, a pulse generating circuit, a modulation circuit and a print processor. The mode selection switch is adapted for selectively setting one of ordinary toner consumption mode and a toner economizing mode. The image buffer is provided in the main frame for storing as dot data an image to be printed. The a pulse generating circuit is provided in the main frame for generating dot pulses indicative of ON and OFF of each dot in accordance with the dot data stored in the image buffer. The modulation circuit is provided in the main frame and is connected to the pulse generating circuit for modulating the dot pulses generated from the pulse generating circuit and for outputting the modulated dot pulses in accordance with a mode selected by the mode selection switch. The print processor is provided in the main frame for performing printing process in accordance with the modulated dot pulses outputted from the modulation circuit.

In a preferred embodiment, the modulation circuit includes a shift register for delaying by a predetermined period the dot pulses generated from the pulse generating circuit if the toner economizing mode is selected by the mode selection means, and an AND gate circuit connected to the shift register for outputting a logical product of the dot pulses generated from the pulse generating circuit and the dot pulses delayed by the predetermined period by the shift register.

In another aspect of the invention, there is provided an electrophotographic type printer using toner for printing a toner image onto a sheet comprising mode selection means for selectively setting one of ordinary toner consumption mode and a toner economizing mode, image buffer means for storing as dot data an image to be printed, pulse generating means for generating dot pulses indicative of ON and OFF of each dot in accordance with the dot data stored in the image buffer means, modulation means connected to the pulse generating means for modulating the dot pulses generated from the pulse generating means and for outputting the modulated dot pulses in accordance with a mode selected by the mode selection means, and print processing means for performing printing process in accordance with the modulated dot pulses outputted from the modulation means.

According to the present invention, dot pulses indicative of ON and OFF of each dot are generated in the pulse generating circuit in accordance with the dot data stored in the image buffer. If the toner economizing mode is selected in the mode selection switch, the modulating circuit modulates the dot pulses in such a manner that each ON width of the pulse becomes narrow. Print processing is carried out based on the modulated dot pulses.

In the preferred embodiment, if the toner economizing mode is selected in the mode selection switch, the dot pulses are delayed by a predetermined period by the shift register. The AND gate circuit then outputs a logical product of the dot pulses from the pulse generating circuit and the dot pulses delayed by the predetermined period. Accordingly, ON width of each dot pulse can be narrow, to reduce toner consumption amount.

DETAILED DESCRIPTION OF THE PREFERRED EMBODIMENTS

Figure 1:
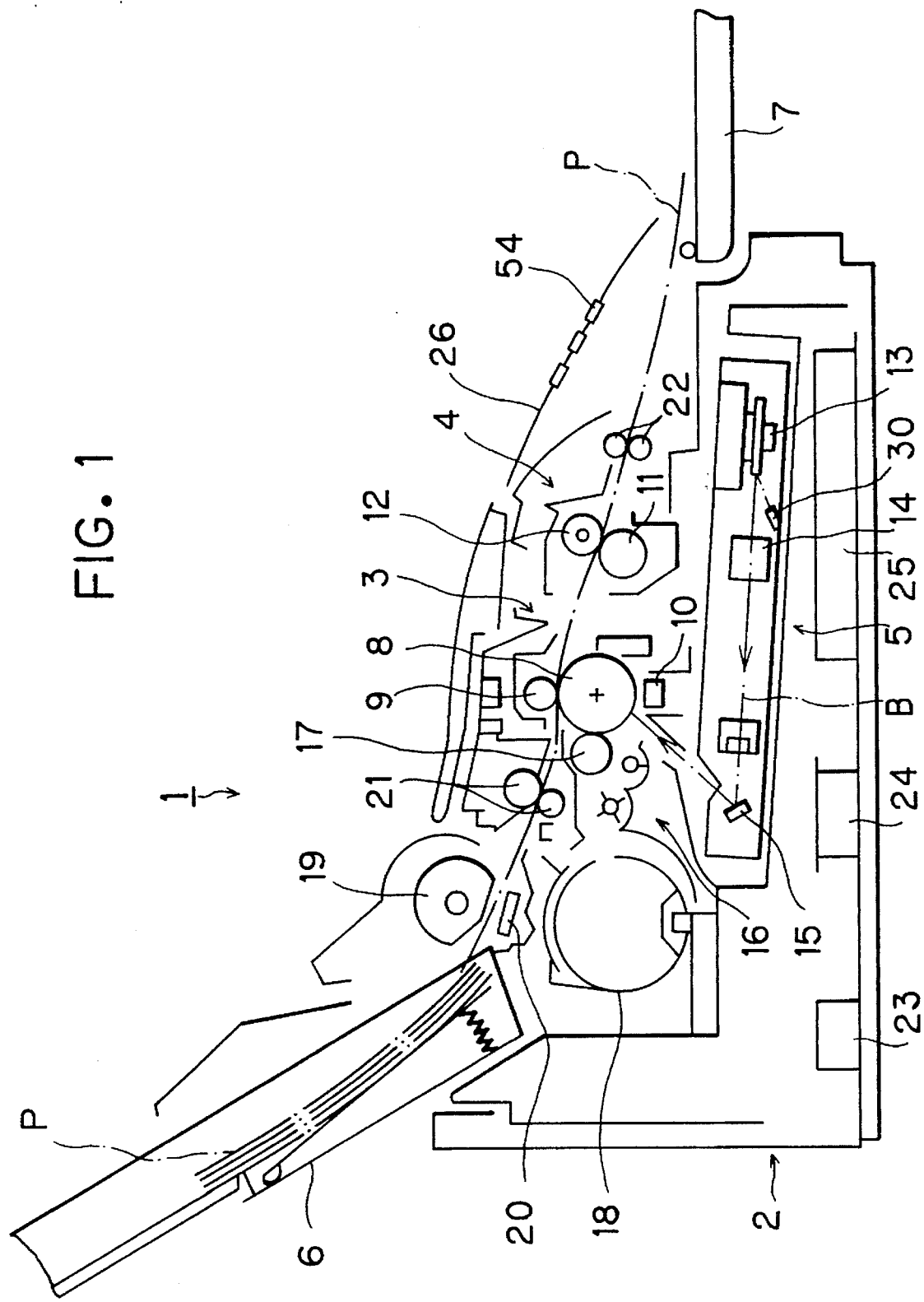
FIG. 1 is a schematic cross-sectional side view showing a laser printer according to one embodiment of the present invention.

A printer according to one embodiment of the present invention will hereinafter be described with reference to the drawings. FIG. 1 shows a laser printer 1 having a main frame 2 in which are disposed a recording process unit 3, a fixing unit 4, and a laser scanner unit 5. A sheet cassette 6 is detachably provided onto an upper portion of the main frame 2. Further, a sheet discharge tray 7 is provided at the front portion of the main frame 2. The recording process unit 3 includes a photosensitive drum 8, a transfer roller 9 and a charger 10 positioned in confrontation with the photosensitive drum 8 for charging the same. The fixing unit 4 includes a heat roller 11 and a pressure roller 12. The laser scanner unit 5 includes a laser diode 30, a scanner motor 13, a lens 14, and a reflection mirror 15.

A developing device 16 is provided in the vicinity of the recording processing unit 3. The developing device 16 includes a developing roller 17 positioned in confrontation with the photosensitive drum 8. Further, a toner cartridge 18 is provided which accumulates therein toners for supplying the toner to the developing roller 17. A sheet supply roller 19, a separation pad 20, a pair of feed rollers 21, and a pair of discharge rollers 22 are provided along a sheet passage on which a sheet P supplied from the sheet cassette 6 runs. Further, a power source unit 23, a control circuit board 24 and a laser driving circuit board 25, etc., are provided in the main frame 2. The main frame 2 has an upper surface on which a front panel or an operation panel 26 is provided. The front panel 26 is provided with various switches including a toner save mode selection switch 54 described later.

Printing operation in the laser printer 1 will be described. The sheet P in the sheet cassette 6 is supplied to the sheet supply roller 19 and is fed to a position between the photosensitive drum 8 and the transfer roller 9 by the sheet feed rollers 21. On the other hand, the laser scanner unit 5 irradiates laser beam B to the photo-sensitive drum 8 from the laser diode 30 by way of the lens 14 and the reflection mirror 15 in accordance with image data transmitted from a personal computer (see FIG. 2). As a result, an electrostatic latent image is formed on the photosensitive drum 8. The latent image is converted into a toner image by the developing device 16, and the toner image is transferred onto the sheet P by the transfer roller 9. The image transferred to the sheet P is fixed at the fixing unit 4, and the sheet P is discharged onto the discharge tray 7 by the discharge rollers 22.

Figure 2:
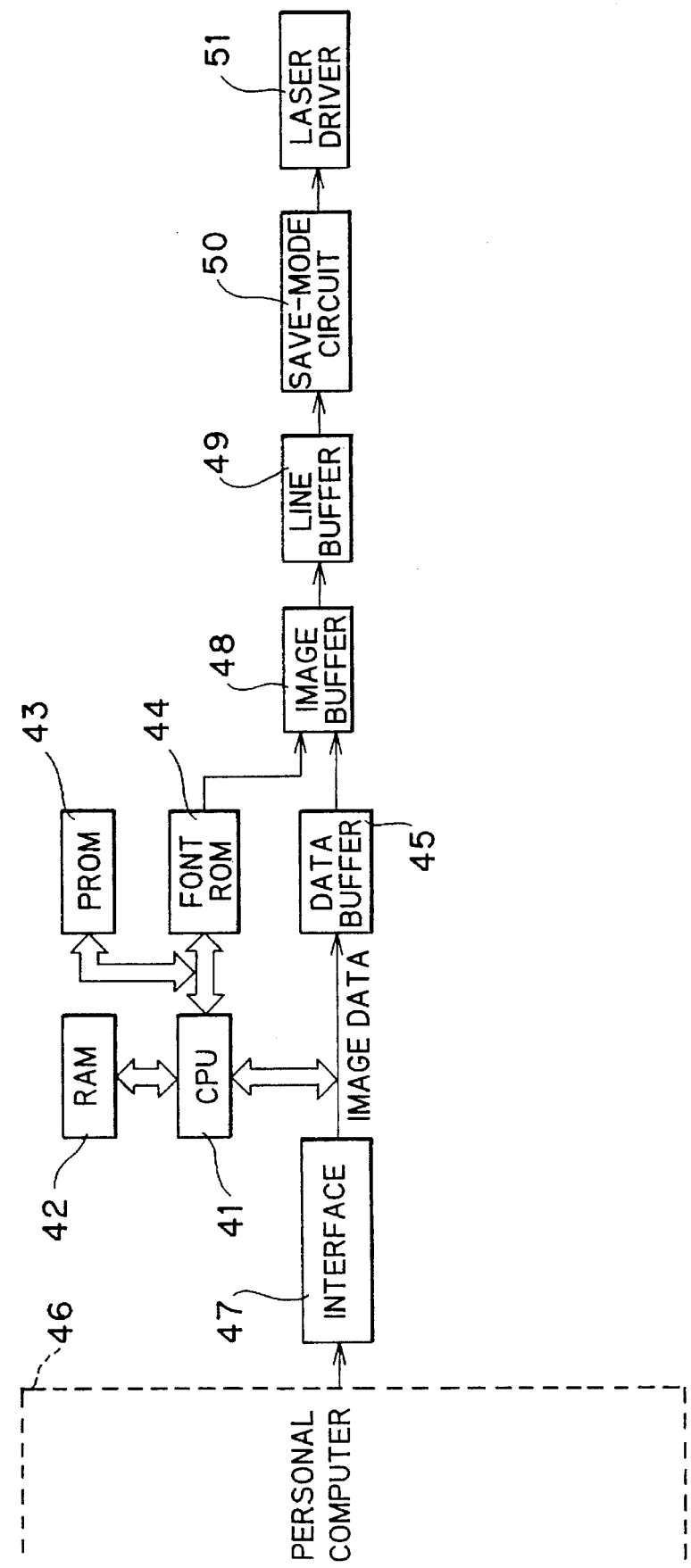
FIG. 2 is a block diagram showing an internal arrangement of the laser printer according to the embodiment.

FIG. 2 is a block diagram showing an internal electrical connection in the laser printer 1. A CPU 41 is adapted for controlling overall operation of the printer 1. A RAM 42 is adapted for temporarily storing various data for processing printing. A PROM 43 is adapted for storing various control programs. A FONTROM 44 is adapted for storing character pattern data. A data buffer 45 is adapted for storing image data transmitted from the personal computer 46 through an interface 47. An image buffer 48 is adapted for developing image data stored in the data buffer 45 into dot data with reference to the character pattern stored in the FONTROM 44, and for storing the dot data therein. The line buffer 49 is adapted for storing dot data which represents a single line of the sheet P, the dot data being stored in the image buffer 48.

A save-mode circuit 50 is adapted for generating and sending dot pulse to a laser driver 51, the dot pulse being indicative of ON and OFF of each dot in accordance with the one-line dot data stored in the line buffer 49. Luminous control of the laser diode 30 shown in FIG. 1 is effected by the laser driver 51. In the illustrated embodiment, the laser diode 30 is rendered ON upon input of high level pulse, and is rendered OFF upon input of low level pulse.

Figure 3:
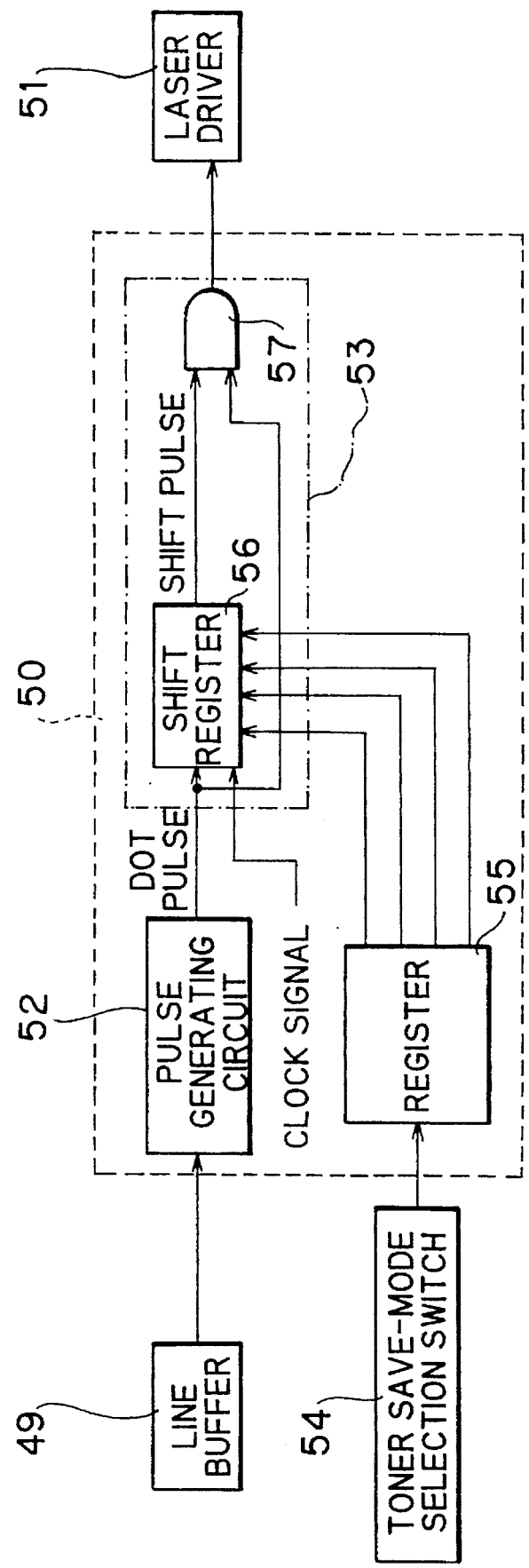
FIG. 3 is a block diagram showing an internal arrangement of a save-mode circuit in the laser printer.

FIG. 3 is a block diagram showing an internal arrangement of the save-mode circuit 50. The save mode circuit 50 includes a pulse generating circuit 52 for generating dot pulse indicative of ON and OFF of each dot in accordance with the one line dot data transmitted from the line buffer 49, a modulation circuit 53 for modulating dot pulse generated from the pulse generation circuit 52 and outputting the modulated dot pulse to the laser driver 51, and a selection register 55 for modulatingly controlling the modulation circuit 53 in accordance with the mode selection signal transmitted from the toner save-mode selection switch 54.

The modulation circuit 53 includes a shift register 56 for outputting a shift pulse, and an AND gate circuit 57. The dot pulse from the pulse generation circuit 52 is delayed by predetermined period of time by virtue of clock pulse so as to output the shift pulse. The AND gate circuit 57 is adapted for outputting a logical product of the dot pulse generated form the pulse generating circuit 52 and the shift pulse delayed by a predetermined time period by the shift register 56.

The mode selection switch 54 generally provides the ordinary toner consumption mode and the toner-save mode which includes first through fourth toner save modes. The mode is cyclically changed in order from one mode to the other mode in accordance with depression of the mode selection switch 54. The fourth toner save mode is the most toner saving mode.

Four output lines connect the selection register 55 to the shift register 56 so as to store in the register 56 the toner consumption mode selected by the mode selection switch 54. A combination of the output signals transmitted through the four output lines will determine the delay of the dot pulse in the shift register 56. For example, in case of an ordinary consumption mode, four "zero" signals (0,0,0,0) are outputted to the shift register 56 from the selection register 55. In this case, delay of the dot pulse is not performed in the shift register 56. In the first toner save mode, signals of (0, 0, 0, 1) are transmitted through the respective four lines. In the second toner save mode, signals of (0, 0, 1, 1) are transmitted through the respective four lines. In the third toner save mode, signals of (0, 1, 1, 1) are transmitted through the lines, and in the fourth toner save mode, signals of (1, 1, 1, 1) are transmitted through the lines from the selection register 55 to the shift register 56.

In accordance with the selected toner consumption mode, i.e., in accordance with the combination of the four signals outputted from the selection register 55, the dot pulse inputted from the pulse generating circuit 52 into the modulation circuit 53 is modulated.

Figure 4:
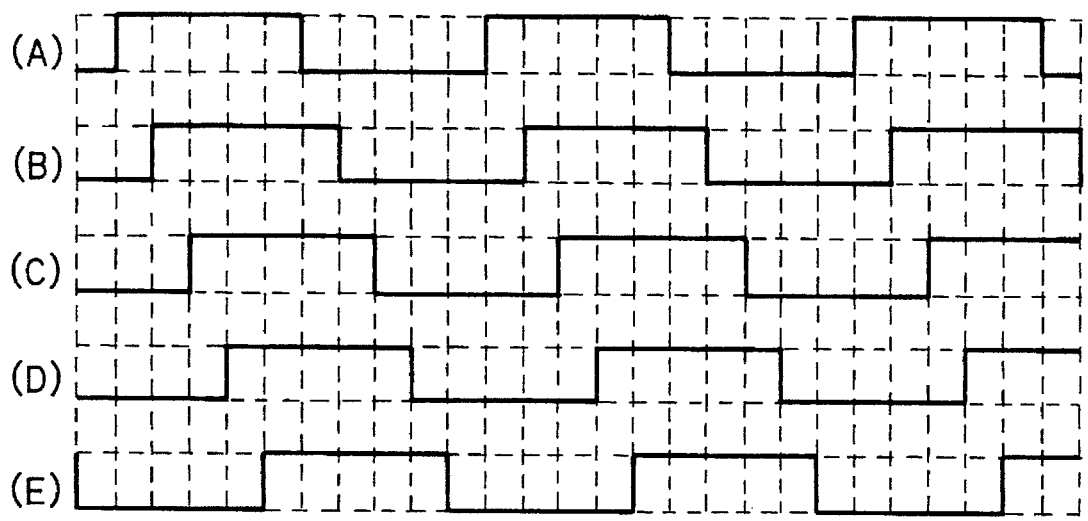
FIGS. 4A, 4B, 4C, 4D and 4E is a time chart showing dot pulse and first to fourth shift pulses delayed from the dot pulse.

The shift register 56 in the modulating circuit 53 can select one pulse among the five kinds of pulses shown in FIG. 4. In FIG. 4, (A) is the dot pulse outputted from the pulse generating circuit 52. (B) is a first shift pulse which is delayed or shifted by one clock from the dot pulse (A). (C) is a second shift pulse which is delayed by two clocks from the dot pulse (A), (D) is a third shift pulse which is delayed by three clocks from the dot pulse (A), and (E) is a fourth shift pulse which is delayed by four clocks from the dot pulse (A).

If the combination of the signals transmitted from the selection register 55 is (0, 0, 0, 0), the dot pulse (A) is outputted from the shift register 56. On the other hand, if the combination of the signals is (0,0,0,1) the first shift pulse (B) is outputted from the shift register 56. Similarly, the second shift pulse (C) is outputted in response to the combination of the signals of (0, 0, 1, 1), third shift pulse (D) is outputted in response to the signals of (0, 1, 1, 1), and the fourth shift pulse (E) is outputted from the shift register 56 in response to the signals (1, 1, 1, 1).

Figure 5:
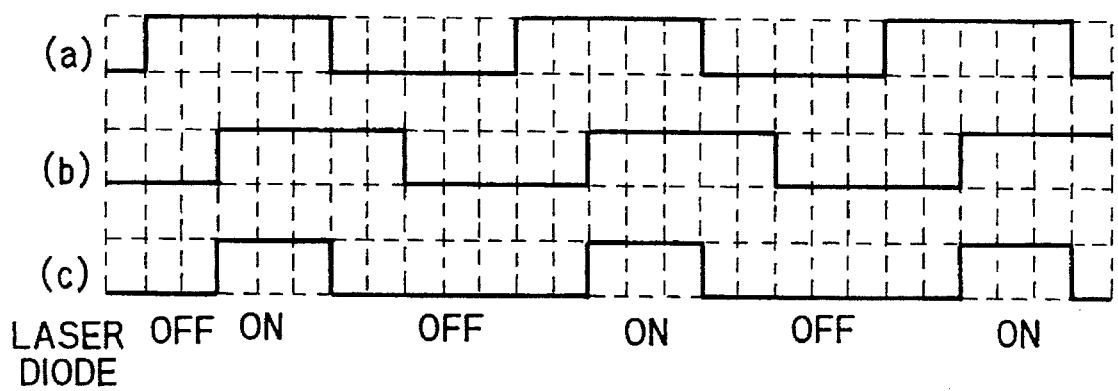
FIGS. 5A, 5B and 5C is a time chart showing change in dot pulse, shift pulse and output pulses from an AND gate circuit.

Operation in the save-mode circuit 50 under the selection of the toner save mode will be described with reference to FIG. 5. FIG. 5 shows time charts showing changes in dot pulse (a), shift pulse (b) and output pulse (c) from the AND gate circuit 57. In case of high level state in each pulse, the laser diode 30 emits light, and in case of low level state in each pulse, no luminous operation is performed in the laser diode 30. Accordingly, if the laser diode 30 emits light in response to the high level, the laser beam B forms the latent image on the photosensitive drum 8, and the toner image is provided by the developing device 16. That is, an image is formed on the sheet P. On the other hand, the laser beam is not provided by the laser diode 30 in response to the low level pulse, no image is formed on the sheet P.

If dot data containing one line data are transmitted from the line buffer 49, the dot pulses (a) indicative of ON and OFF of each dot are generated from the pulse generation circuit 52. The dot pulses are delayed in the shift register 56 and shift pulses (b) are outputted. In the AND gate circuit 57, logical product of the dot pulses (a) and the shift pulses (b) is provided and the logical products (c) are outputted to the laser driver 51.

More specifically, if (0, 0, 0, 0) signals are transmitted form the register 55, the dot pulse (a) is outputted from the shift register 56. In the AND gate circuit 57, the dot pulse and the identical dot pulse is anded, and therefore, the identical dot pulse is outputted from the modulation circuit 53 to the laser driver 51.

On the other hand, if (0, 0, 1, 1) signals are transmitted from the selection register 55 as a result of the toner consumption mode selection, the second shift pulse is outputted from the shift register 56 (see (b) in FIG. 5). In the AND gate circuit 57, the second shift pulse (b) and the dot pulse (a) is anded. Consequently, the AND output pulse (c) is outputted from the modulation circuit 53.

Since the output pulses (c) from the AND gate circuit 57 is the logical product of the dot pulses (a) and the shift pulses (b), high level period in the output pulses (c) is shorter than that of the dot pulses (a). Accordingly, luminous period of the laser diode 30 is reduced, so that a spot size of the laser beam B irradiated onto the photosensitive drum 8 becomes smaller than that of the beam in the ordinary consumption mode. The toner is affixed to the latent imaging zone on the photosensitive drum 8, i.e., at the laser beam spot portions. Consequently, the amount of toner affixed to the photosensitive drum 8 can be reduced. Apparently, if the fourth toner save-mode is selected, the high level period in the output pulse (c) becomes the shortest. Accordingly, the fourth toner save mode can provide the minimized toner consumption amount.

Figure 6:
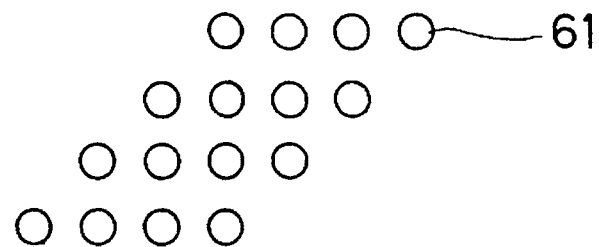
FIG. 6(a) is a printed image under an ordinary toner consumption mode.
FIG. 6(b) is a printed image under a toner economizing mode in a conventional device.
FIG. 6(c) is a printed image under a toner economizing mode in the depicted embodiment.
Figure 6:
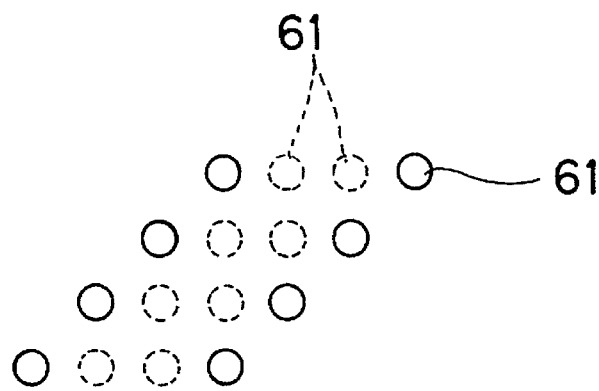
Figure 6:
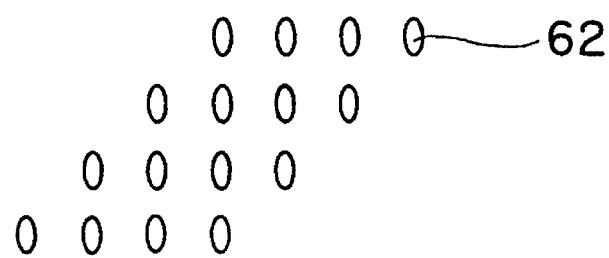

Function and effect will be compared between the conventional printer and the illustrated embodiment with reference to FIG. 6. FIG. 6(a) shows a print image according to ordinary toner consumption mode, FIG. 6(b) shows a print image in accordance with toner economizing mode in the conventional printer according to JP'574 publication, and FIG. 6(c) shows a print image in accordance with toner economizing mode in the illustrated embodiment. In the conventional printer, as shown in FIG. 6(b), dots 61' are omitted among the dots 61 to be printed due to the thinning out processing, and therefore, a central white-out portion may be created in the resultant image. In the illustrated embodiment, as shown in FIG. 6(c), size of the dots 62 are reduced, and no white-out portion is provided. Thus, according to the thinning-out printing in the conventional printer, fine characters or lines may disappear to degrade the printing quality. On the other hand, in the illustrated embodiment, such image disappearance does not occur, and sufficient printing quality can be maintained.

By the thus arranged toner save mode, toner consumption amount per one dot can be controlled and reduced, and therefore, printing quality can be maintained while economizing the toner consumption, to thus reduce running cost of the laser printer 1. Further, a plurality of levels can be provided as the toner save mode. In accordance with the selected level, phase of the shift pulse outputted from the shift register 56 can be properly controlled, to thereby control delaying period of the dot pulse. Thus, multi-stage or fine control to the toner consumption can be performed.

While the invention has been described in detail and with reference to the specific embodiment thereof, it would be apparent to those skilled in the art that various changes and modifications may be made therein without departing from the spirit and scope of the invention. For example, the manner for modulating the dot pulse transmitted from the pulse generating circuit 52 is not limited to the case where the shift register 56 and the AND gate circuit 57 are used. Further, in the depicted embodiment, the toner mode selection is made by depression of the toner mode selection switch. However, selection of the toner consumption mode can also be made by way of a signal transmitted from a personal computer.

As described above, in the printer of the present invention, dot pulses indicative of ON/OFF of each dot is modulated and printing operation is carried out based on the modulated dot pulse if the toner economizing mode is selected. Further, fine multiple stage control is achievable in digital manner with respect to the toner consumption, and toner consumption amount per one dot can be reduced. Further, thinning-out processing is not performed, so that disappearance of fine character or line does not occur. Thus, toner consumption can be economized yet maintaining a printing quality at a certain level to thereby lower the running cost.

What is claimed is:

1. An electrophotographic type printer using toner for printing a toner image onto a sheet, comprising:

a main frame;

mode selection switch for selectively setting one of ordinary toner consumption mode and a toner economizing mode;

an image buffer provided in the main frame for storing as dot data an image to be printed;

a pulse generating circuit provided in the main frame for generating dot pulses indicative of ON and OFF of each dot in accordance with the dot data stored in the image buffer;

a modulation circuit provided in the main frame and connected to the pulse generating circuit for modulating the dot pulses generated from the pulse generating circuit and for outputting the modulated dot pulses in accordance with a mode selected by the mode selection switch; and a print processor provided in the main frame for performing printing process in accordance with the modulated dot pulses outputted from the modulation circuit, wherein the modulation circuit comprises:

a shift register for delaying by a predetermined period the dot pulses generated from the pulse generating circuit if the toner economizing mode is selected by the mode selection switch; and an AND gate circuit connected to the shift register for outputting a logical product of the dot pulses generated from the pulse generating circuit and the dot pulses delayed by the predetermined period by the shift register.

2. The electrophotographic printer as claimed in claim 1 wherein the toner economizing mode includes a plurality of toner-save modes providing spot size different from one another, and the printer further comprising a selection register connected to the mode selection switch for storing one of the ordinary toner consumption mode and the toner-save mode selected by the mode selection switch, the selection register outputting a signal indicative of the delaying period to the shift register, the delaying period corresponding to the selected mode.

3. The electrophotographic printer as claimed in claim 2, wherein the selection register is connected to the shift register through a plurality of signal lines, each signal line transmitting therethrough a binary signal, and a combination of binary signals being indicative of the selected mode.

4. The electrophotographic printer as claimed in claim 1, wherein the print processor comprises:

a laser diode for generating a laser beam and rendered ON and OFF in accordance with a high level signal and low level signal of the logical product;

a photosensitive drum having an outer surface to which the laser beam is irradiated so as to provide an electrostatic latent image on the outer surface; and developing means for supplying toner to the photosensitive drum so as to provide a toner image thereon at a position corresponding to the latent image.

5. The electrophotographic printer as claimed in claim 1, further comprising a clock signal generation circuit connected to the shift register, the clock signal generation circuit generating a clock signal and transmitting the clock signal to the shift register where the dot pulse is delayed by numbers of the clock signals.

6. The electrophotographic printer as claimed in claim 1, further comprising an operation panel provided in the main frame, the mode selection switch being positioned at the operation panel.

7. An electrophotographic type printer using toner for printing a toner image onto a sheet, comprising:

mode selection means for selectively setting one of ordinary toner consumption mode and a toner economizing mode;

image buffer means for storing as dot data an image to be printed;

pulse generating means for generating dot pulses indicative of ON and OFF of each dot in accordance with the dot data stored in the image buffer means;

modulation means connected to the pulse generating means for modulating the dot pulses generated from the pulse generating means and for outputting the modulated dot pulses in accordance with a mode selected by the mode selection means; and print processing means for performing printing process in accordance with the modulated dot pulses outputted from the modulation means, wherein the modulation means comprises:

a shift register for delaying by a predetermined period the dot pulses generated from the pulse generating circuit if the toner economizing mode is selected by the mode selection switch; and an AND gate circuit connected to the shift register for outputting a logical product of the dot pulses generated from the pulse generating circuit and the dot pulses delayed by the predetermined period by the shift register.

* * * * *